US010851497B2

(12) United States Patent
Kelarek

(10) Patent No.: US 10,851,497 B2
(45) Date of Patent: Dec. 1, 2020

(54) PAPER WITH ENHANCED STRENGTH AND ENHANCED RESISTANCE TO FATS

(71) Applicant: Jaromir Kelarek, Ratibor (CZ)

(72) Inventor: Jaromir Kelarek, Ratibor (CZ)

(*) Notice: Subject to any disclaimer, the term of this patent is extended or adjusted under 35 U.S.C. 154(b) by 0 days.

(21) Appl. No.: 15/314,391

(22) PCT Filed: May 21, 2015

(86) PCT No.: PCT/CZ2015/000048
§ 371 (c)(1),
(2) Date: Nov. 28, 2016

(87) PCT Pub. No.: WO2015/180699
PCT Pub. Date: Dec. 3, 2015

(65) Prior Publication Data
US 2017/0191221 A1   Jul. 6, 2017

(30) Foreign Application Priority Data
May 27, 2014   (CZ) .................................. 2014-363

(51) Int. Cl.
D21H 19/54 (2006.01)
D21H 21/52 (2006.01)
D21H 17/28 (2006.01)
D21H 21/18 (2006.01)

(52) U.S. Cl.
CPC ............ D21H 19/54 (2013.01); D21H 17/28 (2013.01); D21H 21/18 (2013.01); D21H 21/52 (2013.01)

(58) Field of Classification Search
CPC .............................. D21H 19/54; D21H 17/28
See application file for complete search history.

(56) References Cited

U.S. PATENT DOCUMENTS

| | | | | |
|---|---|---|---|---|
| 3,350,221 A * | 10/1967 | Taylor | ................ | B01D 39/1623 |
| | | | | 427/244 |
| 3,902,959 A * | 9/1975 | DeMatte | ................ | D21H 21/36 |
| | | | | 162/173 |
| 5,776,619 A | 7/1998 | Shanton | | |
| 6,626,807 B1 * | 9/2003 | Richmond | ......... | A63B 21/0552 |
| | | | | 482/123 |
| 6,677,386 B1 * | 1/2004 | Giezen | ................ | C08B 30/12 |
| | | | | 106/206.1 |
| 7,160,420 B2 * | 1/2007 | Helbling | ............... | C08B 31/006 |
| | | | | 162/158 |
| 8,349,464 B2 * | 1/2013 | Wicher | ................ | D21H 27/20 |
| | | | | 428/514 |
| 8,999,110 B2 * | 4/2015 | Hagiopol | ............... | D21H 17/56 |
| | | | | 162/164.6 |
| 9,157,187 B2 * | 10/2015 | Bloembergen | ......... | D21H 17/28 |
| 9,580,865 B2 * | 2/2017 | Karppi | .................. | D21H 21/10 |
| 2004/0063868 A1 * | 4/2004 | Kobayashi | ............. | C08L 79/08 |
| | | | | 525/420 |
| 2005/0061203 A1 | 3/2005 | Helbling et al. | | |
| 2006/0225854 A1 | 10/2006 | Ono et al. | | |
| 2006/0254737 A1 | 11/2006 | Anderson et al. | | |
| 2008/0193784 A1 | 8/2008 | Tippit | | |
| 2009/0173775 A1 * | 7/2009 | Swoboda | ................ | A47G 19/03 |
| | | | | 229/407 |
| 2010/0291822 A1 * | 11/2010 | Netravali | ................ | B32B 5/026 |
| | | | | 442/153 |
| 2011/0171385 A1 * | 7/2011 | Pal | ....................... | B41M 5/5236 |
| | | | | 427/256 |
| 2012/0263894 A1 * | 10/2012 | Bloembergen | ......... | D21H 19/54 |
| | | | | 428/32.21 |
| 2015/0315750 A1 | 11/2015 | Ranocchia et al. | | |
| 2018/0002867 A1 * | 1/2018 | Perrin | .................... | D21H 17/28 |

FOREIGN PATENT DOCUMENTS

| | | | | |
|---|---|---|---|---|
| CN | 103061205 A | | 4/2013 | |
| DE | 264 927 A1 * | | 2/1989 | ................ C08J 3/10 |
| EP | 1 176 255 A1 | | 1/2002 | |
| EP | 2 148 003 A1 * | | 1/2010 | ............. D21H 21/18 |
| JP | 8-27695 A * | | 1/1996 | ............. D21H 19/54 |
| JP | 2006-183221 A | | 7/2006 | |
| KR | 10-2014-0014815 A | | 2/2014 | |
| WO | WO 00/69916 A1 | | 11/2000 | |
| WO | WO 2011/084692 A1 | | 7/2011 | |
| WO | WO 2011/113119 A1 | | 9/2011 | |
| WO | WO 2013/180643 A1 | | 12/2013 | |

OTHER PUBLICATIONS

International Search Report (PCT/ISA/210) dated Sep. 28, 2015, by the European Patent Office as the International Searching Authority for International Application No. PCT/CZ2015/000048.
Written Opinion (PCT/ISA/237) dated Sep. 28, 2015, by the European Patent Office as the International Searching Authority for International Application No. PCT/CZ2015/000048.
Search Report dated Nov. 19, 2014 issued in the corresponding Czech Patent Application No. PV2014-363 and English translation (3 pages).

* cited by examiner

*Primary Examiner* — Rip A Lee
(74) *Attorney, Agent, or Firm* — Buchanan Ingersoll & Rooney PC

(57) ABSTRACT

Paper with increased strength and increased resistance against greases whose nature is that the paper contains 0.1%-40% of the weight share of biopolymeric starch whose primary particles have the sizes of 1 to 750 nanometres.

9 Claims, No Drawings

PAPER WITH ENHANCED STRENGTH AND ENHANCED RESISTANCE TO FATS

FIELD OF THE INVENTION

The invention comprises paper composition that resolves problems associated with increased strength and increased resistance of the paper against greases.

BACKGROUND OF THE INVENTION

For a paper to be applied as packaging material, it is important that the paper be sufficiently strong. Currently, one of the methods to achieve increased paper strength consists in enhancing inter-fibre bonds by applying polymeric substances into the paper structure. Starch is also included in this category; usually, cationic starch is used, which offers the advantage of being a natural substance whose application is considered as friendly to the environment given that its application in the structure and on the surface of paper preserves easy biodegradability of thus modified paper; at the same time, starch application poses no restrictions on the possibility of using such paper to produce packaging materials intended to be in contact with foods. In paper production, starch can be applied as a solution into paper mass before the inlet of the paper-making machine, injected as a suspension onto the wet paper sheet, or spread over the surface of finished paper by coating or impregnating systems. The added amount and application of starch solution in paper-mache to increase strength vary based on the type of the produced paper and on the required effect. However, in general the rule applies that an addition of starch to paper mass higher than 1.5% provides only a very slight improvement of strength properties due to limited starch retention in paper mass. Therefore the concentration of starch added to paper masse usually does not exceed 2%. The main disadvantage of starch addition by impregnation is that the sizes of its primary particles range between 1 and 60 micrometers, and when transferred to the liquid phase necessary for impregnation these particles increase in size even further due to swelling up, and in the process of impregnation they cannot penetrate the paper structure and remain on its surface. Given that inter-fibre bonds within paper mass are not strengthened, the resulting increase in strength is low.

Production of greaseproof papers is based on minimizing the pores in the paper structure and by closing the pores on the paper surface, with the purpose of preventing the grease from penetrating the surface and structure of the paper. Currently, several production processes are used, which are based on a high level of wood pulp fibre grinding and/or utilize chemical coating of the paper surface. Production of greaseproof paper of the standard "natural" type without application of chemical products to ensure its greaseproof characteristic is based on a high level of grinding high-quality fibre material of sulfite wood pulp. Papers with a high level of grinding are limited by achieving KIT 2-4 level of the greaseproof characteristic scale with the range KIT 1-12.

High electricity consumption for wood pulp grinding and low flexibility of the used input raw materials are other disadvantages of the given paper type. A high level of the greaseproof characteristic of the "natural" type of greaseproof paper can be achieved only by the pergamentation process. Pergamentation is based on etching and gelatinization of paper fibres using sulphuric acid; this process results in closing the pores or the paper and ensures that grease cannot penetrate its structure. The process is demanding in terms of energy consumption of the pergamentation machine. The process is environmentally demanding due to the use of sulphuric acid. The use of fluorocarbon compounds in coating mixtures is the next development stage of greaseproof paper production. Thanks to their properties, these compounds ensure repulsion of grease on the paper surface, which means that this treatment is applied by coating the surface of the paper. The greaseproof characteristic level in the range KIT 2-12 is regulated by the share of the fluorocarbon compound in the carrier medium of the coat; this carrier medium of the coat is a classical starch derivative with film-producing effects. Fluorocarbon chains C8 pose health risks due to their suspected cancerogenicity. The risk is defined by potential formation of perfluorooctanoic acid. This is why chain C6 is starting to be used instead of the high-risk chain C8; however, a high potential for health and environmental risks exists for chain C6, as well.

For the production of greaseproof paper coated with a mixture of a fluorocarbon compound and film-producing starch, a paper base is used for coating, comprising long-fibre sulfite bleached wood pulp 30%, long-fibre sulfite bleached wood pulp 20%, and short-fibre sulfate bleached wood pulp 50% with the square mass (grammage) of 15 $g/m^2$-350 $g/m^2$. The purpose of designing fibre composition of paper using long-fibre sulfate wood pulp, long-fibre sulfite wood pulp, and short-fibre sulfate wood pulp is to use mutual interconnection of the fibres to create a net in the paper structure in order to achieve paper strength, and in order to reduce, as much as possible, the porosity of paper and coat soak into the structure of the paper base for coating, which ensures greaseproof characteristics of paper in the range, and based on the coat composition, of KIT 1-12.

Considering the need of creating a net to achieve paper strength and to reduce porosity of the paper base for coating and reduction of soak of the greaseproof coat through the paper base for coating, any alterations of the aforementioned used fibre composition are very limited.

Thanks to the non-uniform share of wood pulp fibres in waste paper based on their quality fibre length that affects the ability and quality of creating the net in the paper structure, waste paper can be used to make greaseproof paper to a very limited extent. As a rule, only an admixture of sorted waste paper of high quality classes can be used, i.e. paper where a high share of primary and not yet recycled fibres of wood pulp can be defined. The use of waste paper of lower quality classes to make strong paper is rendered virtually impossible due to a high share of several times recycled, gradually shortened, in every recycling cycle degraded wood pulp fibres. A disadvantage of this technical solution consists in shortened and strength-degraded wood pulp fibres whose ability to form a net in the paper structure is limited; this is negatively manifested in achieved paper strength. The inner structure of the paper base for coating, made of waste paper, is highly porous and limits the possibility of creating a homogeneous greaseproof coat over the whole surface of the paper base for coating, which results in a very low level of the greaseproof characteristic.

SUMMARY OF THE INVENTION

The aforementioned drawbacks of known solutions are considerably removed by paper with increased strength and with increased resistance against greases according to this invention whose substance is that the paper contains 0.1%-40% of the weight share of biopolymeric starch whose primary particles have the sizes of 1 to 750 nanometres.

The main advantage of paper with increased strength and with increased resistance against greases according to this invention is seen in increased strength of the dry paper achieved by applying into the mass a dispersion of the nanoparticle biopolymeric material based on starch, and in elimination or reduction of health risks associated with existing coat mixtures for the production of greaseproof paper by using the aforementioned dispersion of the nanoparticle biopolymeric material based on starch, consisting in partial or complete replacement by fluorocarbon compounds.

Thanks to their particle sizes on the order of hundreds of nanometres (usually less than 150 nanometres), dispersions of the nanoparticle biopolymeric material based on starch are comparable to sizes of fibriles—binding elements between wood pulp fibres in paper, its easily penetrate the paper structure and increase spatial density of inter-fibre bonds in the whole volume of the paper sheet, resulting in its strengthening under dry conditions while preserving environmental friendliness of the paper.

Application of the dispersion of the nanoparticle biopolymeric material based on starch into the paper structure allows for using a broad spectrum of quality classes of waste paper, such as newspapers and journals, including low quality classes of waste paper containing only degraded and several times recycled wood pulp fibres, such as paper boxes, while achieving high strength parameters. Application of the starch biopolymer into the paper structure and increasing the strength of the paper under dry conditions provides the advantage of reducing square mass of paper used to make packages while preserving the required strength of the packages, which reduces consumption of the material used to produce the packages, and which also reduces negative environmental impact in the form of reducing the amounts of released emission gases within the framework of reduced numbers of transports. In the case of paper production from waste paper, environmental friendliness of the paper is increased by reducing the consumption of water, energy and by reducing $CO_2$ emissions compared to paper production from primary, non-recycled wood pulp fibres.

Ability of the nanoparticle biopolymeric material based on starch whose primary particles are sized 1 to 750 nanometres to penetrate the paper structure, and its ability to form a compact greaseproof film after drying of the coat, allows for using the dispersion of the nanoparticle biopolymeric material based on starch without any admixtures in the production of greaseproof papers and/or in mixtures with other materials, where the properties of fluorocarbon compounds, film-forming starch and dispersion of the nanoparticle biopolymeric material based on starch support mutual mixing and formation of new types of mixtures that synergically join individual advantages of the properties of individual materials used for the production of greaseproof papers, including substances increasing resistance of the greaseproof coat under wet conditions. Thus designed coats make it possible to create a compact, greaseproof film that ensures separation of the paper base from the packaged foods by a film, which prevents the release of fibrous and mineral particles into the foods, thereby allowing for the production and use of the greaseproof paper based on recycling of waste papers of various qualifies and classes. At the same time, application of the dispersion of the nanoparticle biopolymeric material based on starch into the paper structure to increase the paper strength under dry conditions helps to close inner structures of the paper and reduces soak of the greaseproof coat into the structure, which increases the quality of the surface coat and the level of the greaseproof characteristic while preserving high strengths of the paper, with the possibility of using flexible composition of raw materials even of low quality to achieve the required qualitative parameters of the package. Application of the dispersion of the nanoparticle biopolymeric material based on starch, itself or in a mixture with other materials, into the inner structure and on the surface of the paper can be carried out using technology commonly used in the paper making industry (doctor blade, film press, gateroll, size press, spraying and impregnation, etc.), including products used to adapt the properties of the coat suspension (adaptation of rheological properties and application of water-retaining products).

The papers may be modified in various ways as regards the fibre composition and use of other chemical additives in application of the dispersion of the nanoparticle biopolymeric material based on starch to achieve paper strength under dry conditions, to increase the strength under wet conditions, and to achieve various levels of the greaseproof characteristic and improvement of printability of coats on the paper surface.

For the purpose of proper function, it is advantageous that the paper is equipped, at least on one side, with the deposit of 0.1% to 30% weight share of biopolymeric starch whose primary particles have sizes from 1 to 750 nanometres, and furthermore, the paper surface contains 0.1% to 15% weight share of the film-forming starch and/or 0.01% to 2% weight share of the perfluorooctanoic acid, and that the paper also contains a substance based on polyamidoamine-epichlorohydrin resin in the amount of 0.05%-0.4% weight share, and that the paper is covered, at least on one side, with the deposit of 1% to 30% weight share of a substance based on calcium carbonate and like.

EXAMPLES OF THE INVENTION

Example 1

Paper with increased strength and/or increased resistance against greases according to this invention, produced by impregnating paper made from waste paper fibres. The paper used for impregnation has the square mass of 91 $g/m^2$. The impregnation is achieved by immersing into a dispersion of the nanoparticle biopolymeric starch whose primary particles have the sins of 50 to 90 nanometres. The impregnation dispersion is composed of water and the nanoparticle biopolymeric starch whose concentration in the impregnation water-based dispersion is 19.8% of the weight share. The content of the nanoparticle biopolymeric starch in the impregnated paper is 20.6% the weight share. Supply of the nanoparticle biopolymeric starch into the paper structure is manifested by an increase in its strength properties expressed by the mean tear length (ČSN EN ISO 1924-2) as follows. The average breaking length of non-impregnated paper is 2.4 km; average breaking length of the paper after impregnation is 4.3 km.

Example 2

Paper with increased strength and/or increased resistance against greases according to this invention, produced by impregnating paper made from non-bleached sulfate wood pulp. The paper used for impregnation has the square mass of 67 $g/m^2$. The impregnation is performed using a dispersion of the nanoparticle biopolymeric starch whose primary particles have the sizes of 50 to 90 nanometres. The impregnation dispersion is composed of water and the nanoparticle biopolymeric starch whose concentration in the impregnation water-based dispersion is 10.3% of the weight share. The content of the nanoparticle starch in the impregnated paper is 10% of the weight share. Supply of the nanoparticle biopolymeric starch into the paper structure is manifested by an increase in its strength properties expressed by the average breaking length (ČSN EN ISO 1924-2) as follows. The average breaking length of non-impregnated paper is 3.7 km; the average breaking length of the paper after impregnation is 4.9 km. If no spray coat was implemented, the strength of this paper would be expressed by the average breaking length of 2.3 km.

Example 3

Paper with increased strength and/or increased resistance against greases according to this invention, produced by applying the nanoparticle biopolymeric starch in a spray. The spray is applied onto the suspension of wood pulp fibres on the paper-making machine screen. Concentration of the dispersion of the nanoparticle biopolymeric starch used for spraying is 21.1% of the weight share, and sizes of primary particles of the starch range between 50 and 90 nanometres. The content of the nanoparticle biopolymeric starch in the produced paper is 8.5% of the weight share, and strength of this paper expressed by the average breaking length (ČSN EN ISO 1924-2) is 4.9 km.

Example 4

Paper with increased strength and/or increased resistance against greases according to this invention, produced by impregnating waste sulfate paper of square mass 86 g/m$^2$ and average breaking length (ČSN EN ISO 1924-2) of 5.0 km. The impregnation is performed using a dispersion of the nanoparticle biopolymeric starch whose primary particles have the sizes of 50 to 90 nanometres. The impregnation dispersion is composed of water and the nanoparticle starch whose concentration in the impregnation water-based dispersion is 9.8%. The content of the nanoparticle starch in the impregnated paper is 8.6% of the weight share. The average breaking length of the paper after impregnation of the nanoparticle biopolymeric starch is 6.0 km. Furthermore, double-sided coat is applied onto thus adapted paper using a coat dispersion. The coat dispersion is composed of water and the nanoparticle biopolymeric starch with the sizes of its primary particles ranging preferably between 50 and 90 nanometres, whose content in the coat water-based dispersion is 15.8% of the weight share. The weight of this double-sided coat after drying is 5 g/m$^2$. This impregnated and coated paper contains the total of 13.1% of the weight share of the nanoparticle biopolymeric starch and provides resistance against greases (determined using the method TAPPI T 559 cm-02) of KIT4.

Example 5

Paper with increased strength and increased resistance against greases according to this invention, produced using paper, preferably waste paper, with the square mass of 86 g/m$^2$ and average breaking length (ČSN EN ISO 1924-2) of 5 km, which is impregnated using a water-based dispersion of the nanoparticle biopolymeric starch whose primary particles have the sizes preferably of 50 to 90 nanometres. The impregnation dispersion is composed of water and the nanoparticle starch whose concentration in the impregnation water-based dispersion is 17.8% of the weight share. The content of the nanoparticle starch in the paper after its drying is 10.6% of the weight share, and the square mass is 96 g/m$^2$. The average breaking length of the paper after the described impregnation using the dispersion of the nanoparticle biopolymeric starch is 6.2 km.

A coat mixture is applied onto this impregnated paper; in its water phase, the mixture contains 5% weight share of the nanoparticle biopolymeric starch whose sizes of the primary particles range preferably between 50 to 90 nanometres, 7% weight share of the film-forming starch, and 0.15% weight share of a trifluoroacetic acid derivative. The application is performed by double-sided coating using the Mayer's wound bar. Related to the weight of the coated paper, after drying the coat contains 2.05% weight share of the nanoparticle biopolymeric starch, 2.88% weight share of the film-forming starch, and 0.06% weight share of the trifluoroacetic acid derivative. After coating, the paper has the average breaking length of 6.3 km and resistance against grease (TAPPI T 559 cm-02) equal to KIT 5.

Example 6

Paper with increased strength and increased resistance against greases according to this invention, made using paper, preferably waste paper, where cationic polyamidoamine-epichlorohydrin resin is applied into the paper structure under wet conditions in the amount of 0.14% of the paper weight share, achieving the strength under wet conditions of 20% strength under dry conditions. This paper with the square mass of 88 g/m$^2$ and average breaking length (ČSN EN ISO 1924-2) of 5.0 km is impregnated using a dispersion of the nanoparticle biopolymeric starch whose sizes of primary particles ranges preferably between 50 and 90 nanometres. The impregnation dispersion is composed of water and the nanoparticle starch whose concentration in the impregnation water-based dispersion is 17.8% of the weight share. The content of the nanoparticle biopolymeric starch in the paper after its drying is 10.6% weight share, and square mass of the paper is 96 g/m$^2$. The average breaking length of the paper after the described impregnation using the dispersion of the nanoparticle biopolymeric starch is 6.2 km.

Furthermore, a double-side coat is applied onto the impregnated paper using a coat dispersion. The coat dispersion is composed of water and of the nanoparticle biopolymeric starch whose sizes of the primary particles range preferably between 50 to 90 nanometres, whose content in the coat water-based dispersion is 16.7% of the weight share. After coating, the paper contains, in total, 15.7% weight share of the nanoparticle biopolymeric starch, and it has the average breaking length of 63 km and resistance against grease (determined using the method TAPPI T 559 cm-02) of KIT 5.

Example 7

Paper with increased strength and increased resistance against greases according to this invention, produced using paper, preferably waste paper, with the square mass of 86 g/m$^2$, where cationic polyamidoamine-epichlorohydrin resin is applied into the paper structure under wet conditions in the amount of 0.14% of the paper weight share, whereby achieving the strength under wet conditions of 20% strength value under dry conditions. Resistance of the surface of this paper against greases is achieved by application of the double-sided coat using a coat mixture composed of water and of the nanoparticle biopolymeric starch with the sizes of its primary particles ranging preferably between 50 and 90 nanometres, whose content in the coat mixture is 5.5% weight share. After application of this coat mixture on the paper surface, the paper contains, in total, 5.7% weight share of the nanoparticle biopolymeric starch, and resistance of the paper surface against grease (determined using the method TAPPI T 559 cm-02) is KIT 2.

Example 8

Paper with increased strength and increased resistance against greases according to this invention, according to example 6, where the coat on one side contains, in addition to the dispersion of the nanoparticle biopolymeric starch, also a pigment based on calcium carbonate, which improves the ability of printing over the paper. The content of this pigment is 5% of the weight share, related to the paper weight. The aforementioned examples are only illustrative and do not express the entire scale of possible implementations.

INDUSTRIAL APPLICABILITY

Paper with increased strength and increased resistance against greases offers industrial application in the fields of production of paper goods, especially for products such as packaging paper intended for the packaging of foods and of a broad scale of industrial materials containing various amounts of greases and water, for paper bags intended for shops and customers, advertisement bags or recyclable bags designated for waste bins, etc.

The invention claimed is:

1. Paper with increased strength and increased resistance against greases, wherein the paper contains, within its structure, 0.1% to 40% weight share of a biopolymeric starch whose sizes of its primary particles range from 1 to 750 nanometres, and the paper further contains a substance based on a polyamidoamine-epichlorohydrin resin in an amount of 0.05% to 0.4% weight share.

2. Paper with increased strength and increased resistance against greases according to claim 1, wherein on a surface, the paper is covered at least on one side with a deposit of 0.1% to 30% weight share of the biopolymeric starch whose sizes of its primary particles range from 1 to 750 nanometres.

3. Paper with increased strength and increased resistance against greases according to claim 2, wherein the surface of the paper further contains 0.1% to 15% weight share of a film-forming starch and/or 0.01% to 2% weight share of a trifluoroacetic acid derivative.

4. Paper with increased strength and increased resistance against greases according to claim 1, wherein on a surface, the paper has at least on one side a deposit of 1% to 30% weight share of a substance based on calcium carbonate.

5. Paper with increased strength and increased resistance against greases according to claim 1, wherein the sizes of the primary particles of the biopolymeric starch range from 1 to less than 150 nanometres.

6. Paper with increased strength and increased resistance against greases according to claim 1, wherein the sizes of the primary particles of the biopolymeric starch range from 50 to 90 nanometres.

7. Paper with increased strength and increased resistance against greases according to claim 1, wherein the paper contains 5.7% to 40% weight share of the biopolymeric starch.

8. Paper with increased strength and increased resistance against greases according to claim 1, wherein the paper contains 5.7% to 20.6% weight share of the biopolymeric starch.

9. Paper with increased strength and increased resistance against greases according to claim 1, wherein a ratio of an average breaking length of the paper to an average breaking length of a paper without the biopolymeric starch ranges from 1.2 to 1.8.

* * * * *